J. W. HARASTA.
EXPANDING PACKING CONSTRUCTION.
APPLICATION FILED SEPT. 8, 1920.

Patented Nov. 15, 1921.

Witnessed

Inventor
Joseph W. Harasta
By Westall and Wallace
his Attorneys

UNITED STATES PATENT OFFICE.

JOSEPH W. HARASTA, OF LOS ANGELES, CALIFORNIA.

EXPANDING-PACKING CONSTRUCTION.

1,396,836.

Specification of Letters Patent.    Patented Nov. 15, 1921.

Application filed September 8, 1920. Serial No. 408,826.

*To all whom it may concern:*

Be it known that I, JOSEPH W. HARASTA, a citizen of the United States, and residing at Los Angeles, in the county of Los Angeles and State of California, have invented new and useful Improvements in an Expanding-Packing Construction, of which the following is a specification.

This invention relates to reciprocating piston pumps, motors, and the like, and pertains particularly to means for expanding the packing of said pistons without disassembling the cylinder and piston.

Expanding packing has been provided for pistons, and means whereby the packing may be expanded by adjustment of piston parts of special construction. Such devices require both the removal of the pistons and the cylinder heads to provide access to the pistons. Removal of the cylinder heads, as it is ordinarily performed, results in destruction of the gasket and upon replacement of the head requires insertion of the gasket. As many bolts are employed to secure the head to the cylinder, much time is consumed in such operations. This results in the placing the plant out of operation during the time the packing is being adjusted and further loss of time of the other operatives of the plant.

It is the primary object of this invention to provide a cylinder and piston construction, whereby packing may be expanded without removal of the cylinder heads. Another object of the invention is the provision of a piston which may employ any of the well known type of packings and means whereby the packing may be expanded. Without expanding means the packing after slight wear becomes unfit for use and must be discarded. This results in a large waste of material. With devices for expanding the packing, as at present employed, special packing must be used. In addition to the broader features of this invention there are certain details of construction, whereby a simple, durable, and easily manipulated structure is obtained.

Figure 1:
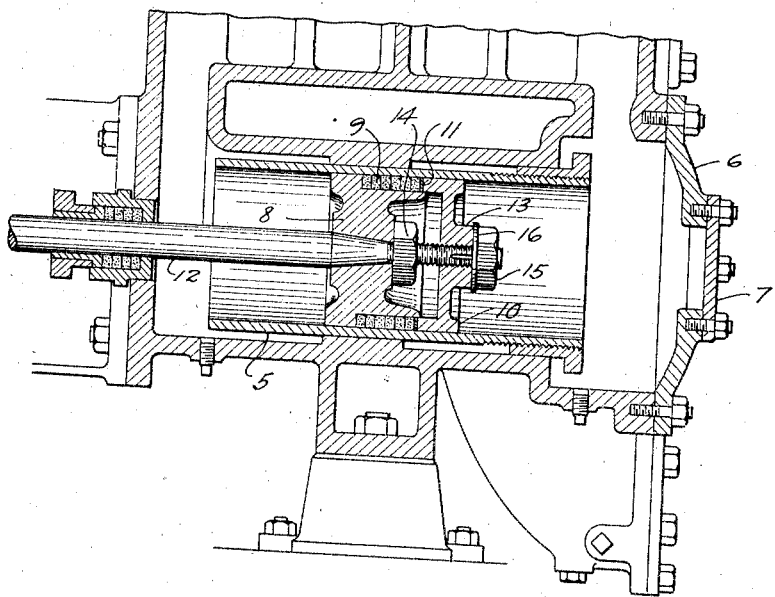
Figure 2:
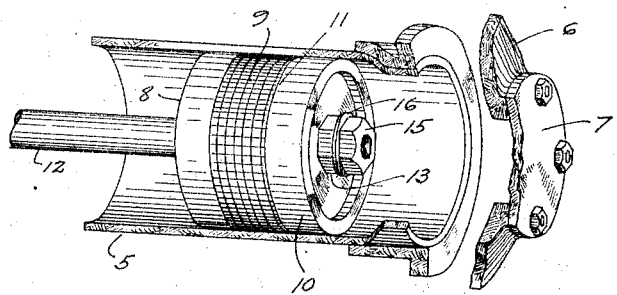
Figure 3:
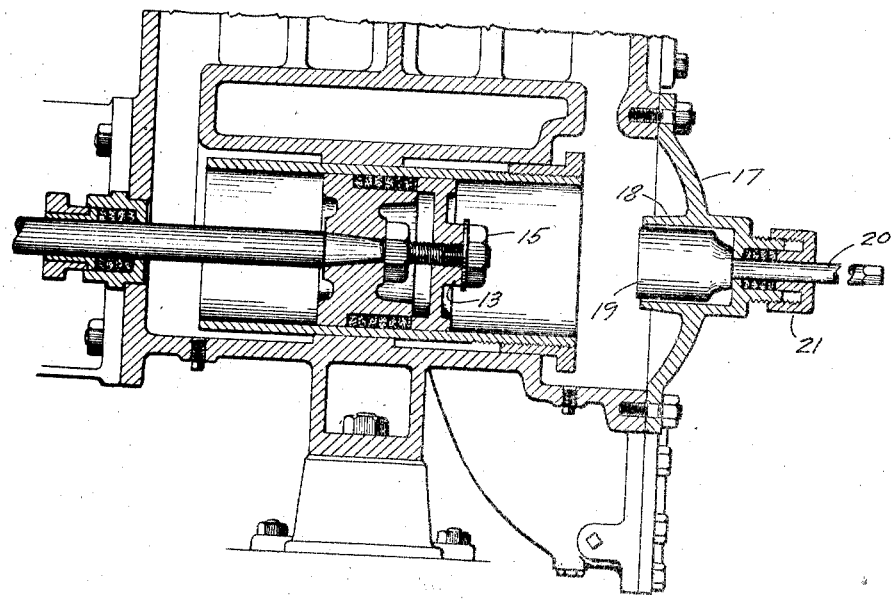

These objects together with other objects and corresponding accomplishments are obtained by means of the embodiment of my invention illustrated in the accompanying drawing, in which:

Figure 1 is a longitudinal section through a pump cylinder and piston employing one form of my invention; Fig. 2 is a perspective view of a piston and a cylinder barrel shown in section with the head removed; Fig. 3 is a section through a cylinder and piston employing another form of my invention; and Fig. 4 is a perspective view partially in section of a construction such as shown in Fig. 3 with a cylinder barrel.

Referring more particularly to Figs. 1 and 2, a pump cylinder of the usual construction is shown. The barrel is indicated generally by 5. Secured to the cylinder is a head 6. The head has a hand hole closed by a cover plate 7. By removal of the cover plate, access to the barrel of the pump and the piston is provided. In Fig. 2 the barrel 5 forms the cylinder proper, otherwise the construction is the same. Mounted in the barrel for reciprocation is a piston having a body 8 formed with a packing groove in which is disposed packing 9. This packing may be the ordinary square type or sleeve type of packing. Telescoping the piston body is a follower 10, a washer 11 being disposed against the packing. A piston rod 12 is tapered adjacent its end and the tapered portion extends into a hole in the body. The end of the rod is reduced in diameter and threaded, the threaded portion extending through a threaded bore of hub 13 of the follower. Firmly securing the piston body in position on the rod is a nut 14. The follower is adjustably secured to the rod by means of the threads, and a lock nut 15 is disposed on the rod with a lock washer 16 interposed between the nut and the hub of the follower. The construction is such that by turning the follower on the rod, pressure may be placed upon the packing and the latter expanded.

To expand the piston packing, the cover 7 is removed and a socket wrench or other tool applied to the nut 15 so that it may be loosened and with it the lock washer. In practice a quarter turn of the nut is sufficient to loosen it. The socket of the wrench can then be applied to the follower at the hub 13 which has flattened sides, and the follower turned to give the expansion desired. In practice a half turn is sufficient. The lock washer 16 and the nut 15 may then be tightened against the hub 13. The cover 7 is again bolted to the head. If a gasket is placed between the cover plate and the cylinder head, the destruction of the same will not incur as much expense, as the destruction of the cylinder head gasket. Furthermore, the number of bolts to be removed is small compared with the number of bolts which it would be necessary to remove for taking down the cylinder head. Thus, time, labor, and material are saved.

Figure 4:
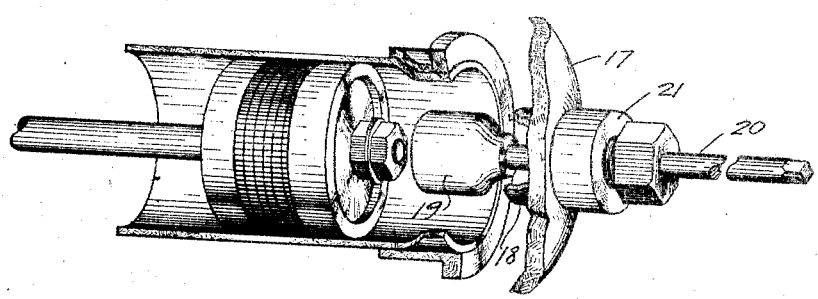

Referring more particularly to Figs. 3 and 4, the piston construction is identical with that shown in Figs. 1 and 2.

Referring to Fig. 3, the head 17 is provided with a pocket 18 in which rests the socket wrench 19. The socket wrench is provided with a stem 20 having a flattened end.

This stem extends through a stuffing box and follower indicated generally by 21. The follower of the stuffing box is normally adjusted to tightly grip the stem.

The construction is such that, when it is desired to expand the packing, the follower on the stuffing box is turned to loosen the grip on the packing and permit the wrench to be moved into the barrel and turned. The wrench socket may then be applied to the nut 15 and the latter loosened. Thereupon, the wrench is forced over the hub 13 and the follower turned so as to properly expand the packing. The wrench socket is then withdrawn into the pocket and the stuffing box follower tightened.

In the construction shown in Fig. 4, the barrel of the pump forms the cylinder, the head 17 being secured directly thereto. However, the head is identical in construction with the head shown in Fig. 3.

It is obvious that I have provided a construction wherein the packing may be expanded without disassembling the pump. Furthermore, special packing is not required for the piston. Time, labor, and material are saved thereby. Saving of time results in the plant being out of operation only a short while.

What I claim is:

1. In a device of the class described, the combination of a cylinder, a piston rod, a reciprocating piston therein normally fixed on said rod and having expansible packing, a follower movable longitudinally of the piston body for expanding said packing and disposed so that said rod extends beyond said follower, a nut and screw device mounted on said rod for moving said follower and holding it fixed in adjusted position, a cylinder head having a pocket, a socket wrench disposed in said pocket and having its stem slidably and rotatably extended through said head for expanding said packing whereby said packing may be expanded from the outside of said cylinder.

2. A piston comprising in combination a piston rod having a threaded end, a piston body fixed on said rod with the threaded end extending therethrough, said piston body being provided with a portion of reduced diameter forming a packing channel, a follower threaded on the extension of said rod and having a hub provided with a wrench hold, said follower telescoping with the reduced portion of said rod and forming therewith an adjustable packing groove, and a lock nut on the threaded end of said rod for holding said follower in position.

In witness that I claim the foregoing I have hereunto subscribed my name this 31st day of August, 1920.

JOSEPH W. HARASTA.